3,176,765
SEALING CALCAREOUS POROUS FORMATIONS
Donald E. Hayford, Hopewell, and Alexander Sadle, Petersburg, Va., assignors to Allied Chemical Corporation, New York, N.Y., a corporation of New York
No Drawing. Filed July 28, 1961, Ser. No. 127,502
4 Claims. (Cl. 166—33)

This invention relates to sealing porous underground formations permeable to water, referred to in the art as "grouting," more particularly to the treatment of naturally occurring porous formations containing appreciable amounts of calcareous material i.e. calcium carbonate or other basic minerals, and to novel sealing compositions for treatment of the porous underground formation.

The sealing process is useful whenever it is necessary to prevent the ingress of an undesirable fluid, such as ground water, into a well, boring, mine, or any subterranean cavity, or whenever it is necessary to prevent the loss of useful fluids into a porous formation or soil. Common examples are found in the oil well drilling industry where it is often necessary to prevent ground water leakage into the well bore with consequent dilution of the drilling mud, or to prevent loss of drilling mud into a porous formation. Subterranean storage of petroleum or petroleum products in natural caverns often requires rendering the reservoir impermeable to ground water and to the stored fluid, a treatment usually referred to as grouting. Similarly, reservoirs and canals often require treatment to prevent loss of liquid into the earth. Frequently it is necessary to inject material around or under the foundations of a building to prevent water leakage or to stabilize the foundation. Other applications are found in mining, underground construction work, and stabilization of sand formations.

Inorganic cements and concretes have been used as sealants for wells and reservoirs, but their heterogeneous nature prohibits their use whenever it is necessary for the sealant to penetrate into a rock formation or soil having fine openings. Such penetration is often necessary in order to obtain complete and permanent sealing against the high hydrostatic pressures encountered in ground water. Various resins have been proposed as sealing compositions, but these materials possess one or more of the following disadvantages: high cost, high viscosity, slow or unpredictable resinification time, especially at low temperatures, poor strength or stability in the presence of water and lack of flexibility to meet varying rock or soil conditions.

Conventional urea-formaldehyde resin suggests itself as a low-cost sealing material, but unfortunately is deficient in several respects. When applied to porous formations the usual acid catalyst for hardening urea-formaldehyde restricts its usage to non-calcareous soils or formations. In calcareous or basic formations and soils the acid catalysts are neutralized before they can achieve appreciable resinification, or else so much catalyst is required that gelation occurs before the resin can be injected into the formation or soil. This is a serious limitation because limestone or limy soils are common in sites where sealing is required. In order to be injected into a porous formation or soil, the sealing material must remain clear and fluid for a sufficient time to permit completion of the injection operation. This time is usually referred to as pumping time. After the soil or formation is impregnated with the sealant, it is desirable that the sealant gel or solidify with as little delay as possible because in most applications pressure must be maintained until the sealant has set up. The time required for gelation or solidification is called gel time. A desirable sealing composition would have a relatively long pumping time preferably about 10 to 30 minutes and a relatively short predictable gel time, 30 minutes to about 2 to 3 hours being satisfactory. In addition the consolidated formation should have water stability and a compressive strength of at least 100 p.s.i. From the foregoing it will be evident that sealing porous formations is not merely a simple injection of a hardening material and that the prior art compositions achieved only partial success in the sealing of porous formations.

An object of the present invention is to provide an efficient, economical process of sealing formations containing calcareous materials.

Another object of the invention is to provide a low-cost, clear fluid sealant having a viscosity of less than 150 cps., a pumping time of about 10 to 30 minutes, a setting time of about 30 minutes to 3 hours which upon application to porous formation will produce a stable formation having a compressive strength in excess of 100 p.s.i.

A still further object is to provide a sealing and stabilizing process employing a composition which may be mixed at prevailing atmospheric temperatures in the range 10 to 40° C. without applying external heat or cooling and employing only ordinary mixing vessels, and which composition may be used to seal porous underground formations within the temperature range of about 10 to 40° C. Other objects and advantages will be apparent from the following description.

The present invention provides a simple, economical means of sealing underground formations or soils. The sealing compositions are initially clear, fluid solutions suitable for injection. In the rock or soil they undergo chemical transformation to form hard, strong, water-insoluble solids, which completely fill the pores of the rock or the soil interstices to form a permanent seal. The sealing compositions of the present invention have the additional advantage of being unaffected by basic (calcareous) solids or formations. They are useful in soils or formations of a calcareous or noncalcareous nature or in mixed formations containing both calcareous and noncalcareous portions.

In accordance with the present invention these and other objects and advantages are accomplished by impregnating porous formations with a clear mobile non-resinous fluid composition composed of a mixture of 40 to 70 parts, preferably 45 to 65 parts, by weight, of a non-resinous urea-formaldehyde condensation product having an average molecular weight within the range of about 120 to 240, preferably an average molecular weight of 140 to 200; 15 to 45 parts, preferably 20 to 40 parts, by weight free formaldehyde; 20 to 60 parts, preferably 25 to 55 parts, by weight free urea; about 30 to 80 parts, preferably 35 to 50 parts, water; and about 0.2 to 2 percent by weight of the total mixture of alkali metal hydroxide, said mixture having a pH greater than 10.5, preferably about 11. It is by this combination of components in defined proportions that the desired advantageous results in grouting operations are obtained. More specifically, one of the most difficult problems in sealing compositions is control of the chemical reactions which cause resinification. Premature resinification would plug the formation and halt injection. Too slow resinification would be costly in terms of labor and equipment tie-up, in delay of the well digging or excavation work, or in quantities of material injected, particularly when injecting into strata where flowing water could carry away unresinified fluid. In addition a good sealant should readily penetrate the porous formation. Certain of the sealing compositions suggested in the art are dispersions of solids which have very low penetrating powers with the result that the particles filter out on the surface and form a solid that is only loosely bonded to the formation and easily dislocated by any back pressure from the formation, thus producing only partial plugging, imparting no physical strength to the plugged formation with the result that sloughing or caving-in can readily occur. In the composition of the present invention the combination of components in the defined proportions cooperate to produce a sealant having the desired characteristics for grouting. The composition is a clear liquid of relatively low viscosity generally below 150 cps., preferably below 100 cps. and consequently is easily injectable and can readily penetrate the porous formation. The composition has the desired pumping time of about 10 to 30 minutes during which period it does not become cloudy or too viscous. The composition has a setting time of about 30 minutes to 2 to 3 hours which factor is important because too short a setting time will cause premature plugging and too long a setting time may cause washing away and also increased labor and material costs. The composition sets into a hard permanent solid material, stable against water and which produces a stable formation having a compressive strength in excess of 100 p.s.i. As a practical matter the item of cost is of importance in grouting operations, since large quantities of sealant are required in this project—it is not uncommon to consume 30,000 gallons of sealing composition in a single grouting operation.

The composition of the present invention is prepared from readily available low cost material. One method of preparation of the sealing composition of the present invention involves first forming the non-resinous low molecular weight condensation products by reacting urea with a molar excess of formaldehyde, about 4 to 8 mols of formaldehyde per mol of urea, under alkaline conditions, preferably at pH 8 to pH 9, and arresting the reaction when the urea-formaldehyde condensation product has an average molecular weight within the range of 120 to 240, providing sufficient water, free formaldehyde and urea to give a composition containing 40 to 70 parts preferably 45 to 65 parts by weight non-resinous urea-formaldehyde condensation product having an average molecular weight within the range of 120 to 240; 15 to 45 parts, preferably 20 to 40 parts by weight free formaldehyde; 20 to 60 parts preferably 25 to 55 parts by weight free urea; about 30 to 80 parts, preferably 35 to 50 parts, water and adjusting the resulting composition to a pH above 10.5 preferably about 11 by the addition of 0.2 to about 2 percent by weight of the composition of alkali metal hydroxide preferably sodium hydroxide or potassium hydroxide. Reaction to form the non-resinous low molecular weight condensation products is desirably carried out at a temperature within the range of 30° to about 60° C. A relatively short reaction time of about 15 minutes to 2 hours will be adequate for production of the low molecular non-resinous condensation products. Depending upon the ratio of formaldehyde to urea employed in the condensation reaction the resulting solution containing non-resinous condensation products may contain free formaldehyde and free urea which are taken into account in providing the required amounts of these constituents. High ratios result in larger amounts of free formaldehyde which in one case may be adequate to supply the required free formaldehyde content of the final composition. Formaldehyde may be utilized as a 30 to 50 percent aqueous solution. Excess water may be removed by vaporization to form a more concentrated composition.

The order of mixing the components of the sealing composition may be varied somewhat. That is, the liquid non-resinous urea-formaldehyde reaction product may be mixed with formaldehyde, urea, water in the defined proportions and the catalyst added immediately or within about four hours. Alternatively, the alkaline catalyst may be mixed with one of the components of the composition and the other components added immediately before use of the sealant. In both cases, the sealing composition should be used promptly after all components are mixed together. Apparatus used in preparing the sealing composition of the present invention need not be of any specialized type and may be of simple design and construction. Any suitable vessel equipped with mixing means and means for introducing the components and discharging product may be employed. The alkali metal hydroxide catalyst is added to the solution just prior to injection into the formation or soil. In order to facilitate mixing, the catalyst is preferably added in the form of aqueous solution. The preferred method of mixing is using a mixing nozzle or proportioning pump so that the solution and catalyst are mixed continuously as they are being injected; however, batch-type mixing may be used.

The concentration of the sealing solution has an important bearing on its grouting behavior. At concentrations below 60 percent i.e. compositions containing more than 40 percent by weight water, the strength of the consolidated porous formation is materially lower than formations having incorporated sealing compositions of high concentrations. In addition the water stability resulting from the use of the lower concentration compositions are inferior. Lower concentrations also have a tendency to reduce the pumping time and unduly increase the gel time. Compositions having a concentration above 90 percent have also been found to give unfavorable results. The preferred concentration of the sealing solution of the present invention is 70 to 80 percent by weight i.e. 20 to 30 percent water. When extra strength or hydrolytic stability is required the formulation may be modified by the addition of up to about 20 percent by weight, preferably 5 to 15 percent by weight of sodium silicate which may be added in the form of a clear sodium silicate solution, such as the commercially available 40 Baumé sodium silicate. Consolidation of the porous formation is accomplished by forcing the sealing solution of the present invention into the porous formation and maintaining the solution in the pores of the formation until it has been solidified as is conventional in grouting operations.

The following examples illustrate the present invention.

*Example 1*

A liquid non-resinous urea-formaldehyde condensation product was prepared by dissolving urea in a 37 percent aqueous formaldehyde solution in the proportion of one mol urea to 4.9 mols formaldehyde, adding sufficient sodium hydroxide solution to increase the pH to about 9.0 and heating the mixture at a temperature of about 50° C. for about 90 minutes to effect condensation of the urea and formaldehyde to low molecular weight non-resinous reaction products. Excess water is removed from the reaction product by evaporation to produce an aqueous solution containing by weight 25 parts free formaldehyde, 40 parts water and 60 parts low molecular weight non-resinous condensation products of urea and formaldehyde having an average molecular weight within the range of about 120 to 240, principally a mixture of dimethylolurea, trimethylolurea and tetramethylolurea. To this mixture is added 40 parts urea and then sufficient 50 percent aqueous sodium hydroxide solution added to give 0.2 weight percent sodium hydroxide in the finished sealing solution. This sealing solution was clear and mobile, having a Brookfield viscosity less than 100 cps. at 25° C.

Example 2

After addition of the sodium hydroxide, a portion of the sealing solution of Example 1 was pumped into a column of packed silica sand. Pumping required a period of about twenty-five minutes. Throughout the pumping period the sealing solution remained highly mobile and no cloudiness or turbidity was noted. The temperature of the packed sand column was about 30° C. The sealing solution was maintained in the sand by exerting pressure on the solution until it solidified in about seventy-five minutes from the end of the pumping time. After twenty-four hours, the packed sand column was cut into sections and inspected. The spaces between the sand grains were completely filled with a hard, white solid, which was insoluble in water. The sections withstood a force above 500 pounds/square inch before crushing.

Example 3

A second portion of the sealing solution was forced into a column of packed marble particles to study the effect of a calcareous formation. The pumping time was about twenty-five minutes as in the test with sand. The time required for solidification of the sealing composition in the column was about seventy-five minutes. The temperature of the packed marble column was 30° C. After twenty-four hours the packed marble column was cut into pieces and inspected. The spaces between the marble particles were filled with a hard, white solid, which was insoluble in water. The sections withstood a force above 500 pounds/square inch before crushing.

Example 4

To a sealing solution as in Example 1 was admixed 40° Baumé sodium silicate solution (1:3.25 $Na_2O/SiO_2$ ratio) to give a final solution containing approximately 2.8 percent NaOH and 7.1 percent $SiO_2$ by weight. The solution was gelled at 30° C. to determine the pumping time and setting time as follows:

| Temperature, ° C. | Time Clear and Fluid, Minutes | Time Required For Solidification, Minutes |
|---|---|---|
| 30 | 15 | 140 |

In sand tests this type of resin showed extra strength and hydrolytic stability in comparison with the compositions prepared without added sodium silicate solution.

The following example illustrates the effect of concentration in the sealing composition on the strength and stability of consolidated sand specimens.

Example 5

Two sealing solutions were employed. The first sealing solution is similar to the sealing solution of Example 1 except that it had a concentration of 60 percent and 1 percent NaOH. The second sealing solution was a 50 percent concentration and contained 1 percent NaOH. One-inch I.D. glass tube approximately 20 inches in length and fitted with exit tubing on the bottom were packed with a fine silica sand, Oklahoma No. 1 creek sand, obtained from the Pennsylvania Glass Sand Company. Each solution was forced through one of the above-described tubes of sand by the application of one atmosphere pressure above the liquid. After the sand column was filled with liquid, the tube was sealed at both ends and allowed to stand twenty-four hours at room temperature. At the end of this period the tubing was cut into two inch lengths, the consolidated sand removed from the glass, and the test specimens were placed in a water bath containing flowing tap water. After various periods of soaking (3–14 days), portions of the test specimens were removed and tested for compressive strength. Results are given in the following table, which shows the advantages in compressive strength and water stability resulting from increase in solids content.

| Solution, Percent Solids | Compressive Strength After Immersion | |
|---|---|---|
| | P.s.i. | Days |
| 50 | 277 | 3 |
| 50 | 254 | 3 |
| 50 | 286 | 3 |
| 50 | 214 | 5 |
| 50 | 227 | 5 |
| 50 | 176 | 7 |
| 50 | 167 | 7 |
| 50 | 166 | 7 |
| 50 | 116 | 14 |
| 60 | 394 | 5 |
| 60 | 453 | 5 |
| 60 | 264 | 14 |

Although certain preferred embodiments of the invention have been disclosed for purpose of illustration, it will be evident that various changes and modifications may be made therein without departing from the scope and spirit of the invention.

We claim:

1. A method of sealing porous underground formations whereby the compressive strength is greater than 100 p.s.i., the pumping time is about 10 to about 30 minutes and the gel time is about 30 minutes to about 3 hours which comprises impregnating the porous formation with a clear mobile non-resinous fluid composition composed of a mixture of 40 to 70 parts by weight of a non-resinous urea-formaldehyde condensation product having an average molecular weight within the range of about 120 to 240; 15 to 45 parts by weight free formaldehyde; 20 to 60 parts by weight free urea; about 30 to 80 parts water; and about 0.2 to 2 percent by weight of the total mixture of alkali metal hydroxide, said mixture having a pH greater than 10.5.

2. A method as claimed in claim 1, wherein said composition contains up to 20 percent by weight sodium silicate.

3. A method of sealing porous underground formations whereby the compressive strength is greater than 100 p.s.i., the pumping time is about 10 to about 30 minutes and the gel time is about 30 minutes to about 3 hours which comprises impregnating the porous formation with a clear mobile non-resinous fluid composition composed of a mixture of 45 to 60 parts by weight of a non-resinous urea-formaldehyde condensation product having an average molecular weight within the range of about 140 to 200; 20 to 40 parts by weight free formaldehyde; 25 to 55 parts by weight free urea; about 35 to 50 parts water; and about 0.2 to 2 percent by weight of the total mixture of alkali metal hydroxide, said mixture having a pH of about 11.

4. A method of sealing naturally occurring porous formations containing appreciable amounts of calcareous material whereby the compressive strength is greater than 100 p.s.i., the pumping time is about 10 to about 30 minutes and the gel time is about 30 minutes to about 3 hours which comprises impregnating said calcareous porous formation with a clear mobile non-resinous fluid composition composed of a mixture of 40 to 70 parts by weight of a non-resinous urea-formaldehyde condensation product having an average molecular weight within the range of about 120 to 240, 15 to 45 parts by weight free formaldehyde; 20 to 60 parts by weight free urea; about 30 to 80 parts water; and about 0.2 to 2 percent by weight of the total mixture of alkali metal hydroxide, said mixture having a pH greater than 10.5.

References Cited by the Examiner

UNITED STATES PATENTS

| 2,224,815 | 12/40 | Glycofrides | 260—69 |
| 2,320,301 | 5/43 | Powers | 260—69 |
| 2,562,867 | 7/51 | Kurtz et al. | 166—33 |
| 2,625,524 | 1/53 | Kvalnes | 260—69 X |

CHARLES E. O'CONNELL, Primary Examiner.